O. L. PRIME.
COMPOSITE METAL PLUG.
APPLICATION FILED JULY 19, 1917.

1,266,989.

Patented May 21, 1918.

UNITED STATES PATENT OFFICE.

ORTON L. PRIME, OF MILWAUKEE, WISCONSIN.

COMPOSITE METAL PLUG.

1,266,989.  Specification of Letters Patent.  Patented May 21, 1918.

Application filed July 19, 1917. Serial No. 181,649.

*To all whom it may concern:*

Be it known that I, ORTON L. PRIME, a citizen of the United States, and resident of Milwaukee, in the county of Milwaukee and State of Wisconsin, have invented certain new and useful Improvements in Composite Metal Plugs; and I do hereby declare that the following is a full, clear, and exact description thereof.

This invention relates broadly to means for uniting two or more metals of different kinds; specifically it consists in securing a bushing or collar of non-corrosive material to a casting of different metal.

The principal object of the invention is to provide means for securing one kind of metal to another so that the first becomes practically an integral part of the other.

With this general object in view, the invention resides in the novel arrangement of parts shown in the accompanying drawing and described more specifically in the following specification and claim.

Figure 1:
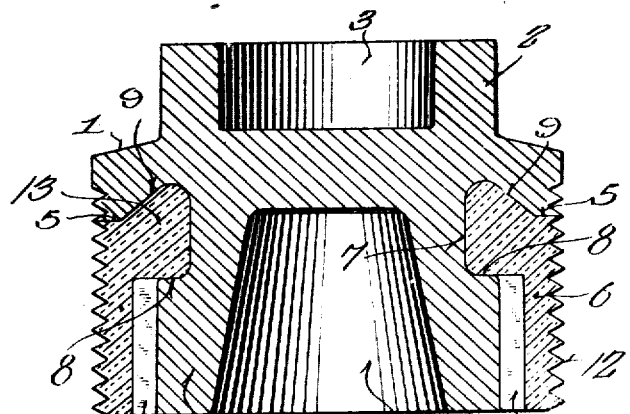
Figure 1 represents a vertical longitudinal sectional view through a screw plug embodying my features of construction.

The device shown in the accompanying illustrations shows merely one form in which my invention might be utilized, it being obvious that it may be employed in various other constructions. The device in the drawing is an ordinary screw plug used for closing the ends of pipes or the like, or for any other purpose where a screw plug or cap is commonly utilized.

The body portion of the plug is designated by the numeral 1, the same being substantially cylindrical for the greater portion of its length, one end being reduced to form a polygonal or non-circular head 2 by which a wrench may be applied to the plug to readily rotate the same. This head is cored out as shown at 3 so as to reduce the amount of metal necessary in constructing the plug.

The end of the plug opposite the head 2 is cylindrically reduced as shown at 4 whereby forming a shoulder 5. It is upon this reduced portion that an annular bushing 6 of non-corrosive metal is placed and held in position against both rotary and longitudinal movement.

Figure 2:
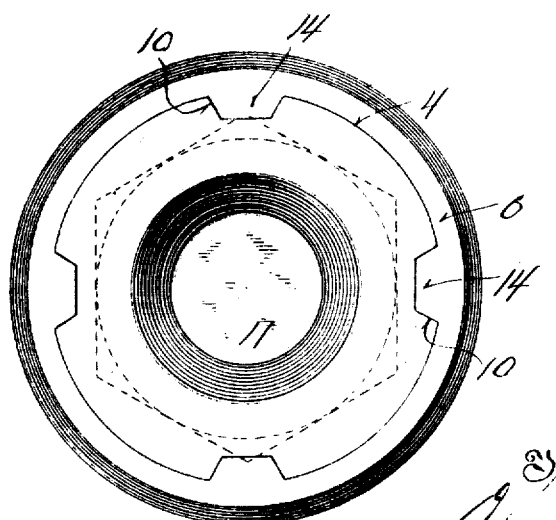
Fig. 2 is a bottom plan view of the parts shown in Fig. 1.

In order to hold the portion 6 on the body of the plug an annular groove 7 is formed in said reduced portion 4 adjacent the shoulder 5, the outer wall 8 of said groove being vertical, while the other wall 9 is inclined inwardly and toward the head 2. From Fig. 1 it will be noted that the wall of the shoulder 5 merges into the inclined wall 9 of the groove 7. A number of other grooves or channels 10 are also formed in this reduced portion 4, these last mentioned grooves extending substantially at right angles to the annular groove 7, or longitudinally of the plug. These longitudinal gooves extend from the ends of the body member and intersect the annular groove 7 through the wall 8 thereof. As shown in Fig. 2 four of the grooves 10 are provided, they being preferably spaced approximately ninety degrees apart. The end of the plug opposite the head 2 is also cored out as shown at 11 for the same purpose that the recess is made in the head 2.

The bushing 6 when placed upon the reduced portion of the plug has its outer face substantially flush with the face of the body portion of the plug, and these faces in the present instance are screw threaded as shown at 12. The inner surface of the bushing at one end carries an annular rib 13 for disposition in the annular groove 7, one wall of the rib being inclined and engaged with the inclined wall 9, while the other is vertical and abuts the vertical wall 8 of the groove. The inner end of the bushing also engages the shoulder 5 so that there will be no space between the two parts of the plug.

In addition to the annular rib 13, the bushing also carries on this inner face a number of longitudinal ribs 14 which are of a length equal to the length of the grooves 10 and are disposed therein. The outer ends of the ribs 14 coincide with the lower end of the bushing and plug while the inner ends are formed integrally with the vertical wall of the rib 13. From this description it will be seen that the rib 13 disposed in the groove 7 will prevent longitudinal movement of the bushing member and the other ribs 14 will hold the parts against rotary movement with respect to each other.

Any desired means may be employed for casting the bushing member upon the reduced portion of the body member, and any convenient form of machine may be used for holding the body member while this is being done. This same construction may well be employed on many other objects than that shown, for instance, wherever it is necessary to provide a non-rusting or non-corrosive surface or a bearing surface. Furthermore the same arrangement may be carried out in the connection with flat objects as well as those which are cylindrical.

What is claimed:—

A composite metal plug comprising a cylindrical shell having a head portion of greater diameter than its body portion and provided with a continuous annular groove between the head and body portion, the circumferential base of each groove being of less diameter than the shell body, the groove thus forming a pocket, longitudinal grooves formed in the surface of the aforesaid body portion of the shell and extending throughout its length and terminating at the circumferential groove, and a metallic casing jacket fitted to the shell body, annular and longitudinal grooves to form a casing of approximately the same diameter as that of the shell head.

In testimony that I claim the foregoing I have hereunto set my hand at Milwaukee, in the county of Milwaukee and State of Wisconsin.

O. L. PRIME.